United States Patent
Testa

[11] Patent Number: 6,166,658
[45] Date of Patent: Dec. 26, 2000

[54] SPEED LIMIT CONTROL SYSTEM

[76] Inventor: David P. Testa, 707 Chapelgate Dr., Odenton, Md. 21113

[21] Appl. No.: 09/444,829

[22] Filed: Nov. 22, 1999

[51] Int. Cl.[7] ..................................................... G08G 1/09
[52] U.S. Cl. ......................... 340/905; 340/932; 340/936; 701/70; 701/119
[58] Field of Search .................................. 340/901, 905, 340/932, 936; 701/65, 70, 93, 119

[56] References Cited

U.S. PATENT DOCUMENTS

| | | | |
|---|---|---|---|
| 3,656,099 | 4/1972 | Campbell | 340/901 |
| 3,680,043 | 7/1972 | Angeloni | 340/936 |
| 5,315,295 | 5/1994 | Fujii | 340/905 |
| 5,420,794 | 5/1995 | James | 340/932 |
| 5,742,240 | 4/1998 | Asanuma et al. | 340/905 |
| 5,771,007 | 6/1998 | Arai et al. | 340/903 |
| 5,784,005 | 7/1998 | Akutsu et al. | 340/905 |
| 5,805,057 | 9/1998 | Elasminovin | 340/426 |
| 5,819,198 | 10/1998 | Peretz | 340/905 |
| 5,952,941 | 9/1999 | Mardirossian | 340/905 |

FOREIGN PATENT DOCUMENTS

| | | |
|---|---|---|
| 54-55923 | 5/1979 | Japan . |
| 6-36187 | 2/1994 | Japan . |

*Primary Examiner*—Daniel J. Wu
*Attorney, Agent, or Firm*—Richard C. Litman

[57] ABSTRACT

A speed limit control system involving road monitors and speed limit controls in the vehicle which receive signals from road transmitters installed in illuminated signs such as highway signs, traffic lights, rural signs, shopping mall signs, and residential street signs that can automatically lower and restrain the vehicle to the posted maximum MPH speed limit.

4 Claims, 6 Drawing Sheets

SPEED LIMIT CONTROL SYSTEM

BACKGROUND OF THE INVENTION

1. Field of the Invention

The present invention relates generally to a speed limit control system for vehicles traveling on roads. More specifically, the invention is a speed limit control device for vehicles cooperating and completely complying with speed limit control signals on roads.

2. Description of the Related Art

There is an acute need for an economic system for remotely controlling and limiting the speeds of vehicles traveling at speeds above the road's speed limit. The related art of interest describes various speed control systems, but none discloses the present invention.

The related art will be discussed according to its perceived relevance to the present invention.

U.S. Pat. No. 5,135,295 issued on May 24, 1994, to Yutaka Fujii describes a vehicle speed control system used with a vehicle navigation system that provides information relating to the road being traveled on, including curves on the road. Sign-mounted transmitting devices send signals to the vehicle navigation system that will activate throttle and brake controls to automatically slow the vehicle if it is traveling at an unsafe speed to handle the upcoming curve or if the vehicle is above the posted speed limit. The intricate system is distinguishable for its automatic braking control, temperature sensors, magnetism sensors, alarms, and reliance on global positioning satellite system access.

U.S. Pat. No. 5,771,007 issued on Jun. 23, 1998, to Toshiaki Arai et al. describes an auto-cruise system for a vehicle comprising transmitters placed along a highway that take control of a vehicle's cruise control system. The transmitters detect the oncoming vehicle's speed and activates an audible warning and brake and throttle control circuits to slow the vehicle to the posted speed until the vehicle travels out of the transmitter's range. The system is distinguishable for its reliance on the vehicle's auto-cruise system for the transmitted control of an audible warning and brakes control of a speeding vehicle.

Japan Patent No. 6-36187 issued on Feb. 10, 1994, to Hiroshi Sekine describes a speed controller system which is a self-contained road navigation system for a vehicle that provides an alarm and automatic braking/throttle control when a vehicle is approaching a curve in the road at an unsafe speed. The system is distinguishable for its alarm and automatic braking system limited to curved roads.

U.S. Pat. No. 5,819,198 issued on Oct. 6, 1998, to Gilboa Peretz describes a dynamically programmable automotive-driving monitoring and alarming device and system, wherein the transmitters mounted on a corner of traffic signs, not traffic lights as in the present invention, transmit the encode speed limit to the vehicle's alarm system which records and sounds an audible alarm with a library of digitized voice messages. The system is distinguishable for its use of transmitters on traffic signs, the recording of speed in the vehicle's computer and sounding an audible descriptive alarm in the vehicle.

U.S. Pat. No. 5,420,794 issued on May 30, 1995, to Robert D. James describes an automated highway system for controlling the operating parameters of a vehicle. A vehicle is detected by the highway system by a transponder on the vehicle responding to an omni-directional radio frequency transmission from a highway control facility. The highway control facility interrogates the vehicle transponder for identification, destination, inter alia, to route the vehicle, schedule maintenance and provide user services. The facility calculates the location of the vehicle and energizes vehicle mounted actuators to steer, accelerate and brake the vehicle as necessary. The vehicle has a user interface unit whereby the driver can be informed of road, weather and traffic conditions. The user interface unit also permits communications by voice (microphone and loudspeaker), keypad, and CRT. The automated highway system is distinguishable for automating the steering, acceleration and braking of the vehicle.

U.S. Pat. No. 5,742,240 issued on Apr. 21, 1998, to Nobuyoshi Asanuma et a. describes a travel control unit for a vehicle passing through a curved road comprising a map information outputting device, a vehicle position outputting device, a travel control device for controlling the speed, and an alarm device which when activated would stop the travel control device when the vehicle deviates from the set course in a curve. A deviatable course determining device and the travel control device can then control the speed in negotiating the curve. The travel control unit is distinguishable for its emphasis on negotiating a curved road automatically.

U.S. Pat. No. 5,784,005 issued on Jul. 21, 1998, to Eisaku Akutsu et al. describes a communications infrastructure system for vehicles comprising a plurality of beacons on a road transmitting repeated series of at least three kinds of signals. The vehicle has a receiver for receiving the beacon's signals, a unit for discriminating the kind of signal, a memory for recording a past record of the kind of signal, and a signal generator generating a signal corresponding to the past record. The system is distinguishable for emphasizing a system for identifying the vehicle's position on an up lane or a down lane for resolving traffic problems during an accident.

U.S. Pat. No. 5,805,057 issued on Sep. 8, 1998, to Firooz B. Eslaminovin describes a remote vehicle disabling and distress indicator system for a vehicle activated by an external telephone call or internally by a switch. The telephone call sends a signal which is received by the vehicle's modular telephone and the vehicle is disabled by deactivating the ignition coil or closing the fuel valve. A distress sign on the vehicle top is illuminated and a tape machine plays a prerecorded distress message. The system is distinguishable for its disabling function.

Japan Patent No. 54-55923 issued on May 4, 1979, to Hiroyasu Fukaya describes an apparatus for safety control of a vehicle negotiating a curved road. A road transmitter communicates with the vehicle's microcomputer to signal the vehicle of the allowable speed for negotiating the curve. The microcomputer sounds an alarm buzzer if the posted speed limit is exceeded by the vehicle. The apparatus is distinguishable for being limited to an audible warning signal in the vehicle.

None of the above inventions and patents, taken either singularly or in combination, is seen to describe the instant invention as claimed. Thus, an economical speed limit control system which utilizes existing illuminated traffic signs is desired.

SUMMARY OF THE INVENTION

The present invention is a speed limit control system involving road monitors and speed limit controls in the vehicle which receive signals from road transmitters installed in illuminated signs such as highway signs, traffic lights, rural signs, shopping mall signs and residential street signs, that can automatically slow and restrain all vehicles equipped with the speed limit control system to the various maximum posted speed limits. The present invention will also restrain all travelling vehicles from even attempting to speed, thus forcing these vehicles to comply to the various maximum posted speed limits. All the speed limit control system equipped vehicles on the streets, roads and highways will be in full compliance with the various posted speed limits continuously, everywhere and completely.

Accordingly, it is a principal object of the invention to provide an economical vehicular speed limit control system installable in vehicles and road or mall signs which can continuously transmit the speed limiting signals to all approaching vehicles including non-speeding vehicles and vehicles attempting to speed.

It is another object of the invention to provide an economical vehicular speed limit control system installable in vehicles utilizing a dashboard receiver module which visually signals the maximum posted speed limit to the driver.

It is a further object of the invention to provide an economical vehicular speed limit control system installable in vehicles utilizing a dashboard computer control unit controlling the throttle body and fuel injection system to reduce the speed of the vehicle.

Still another object of the invention is to an economical vehicular speed limit, computerized control system installable in vehicles with sensors for (1) determining the throttle body position, and the speed from speed sensors proximate the front (front wheel drive) or rear (rear wheel drive) hub and shaft assemblies; and (2) an accelerator pedal position from a sensor located under the dashboard.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
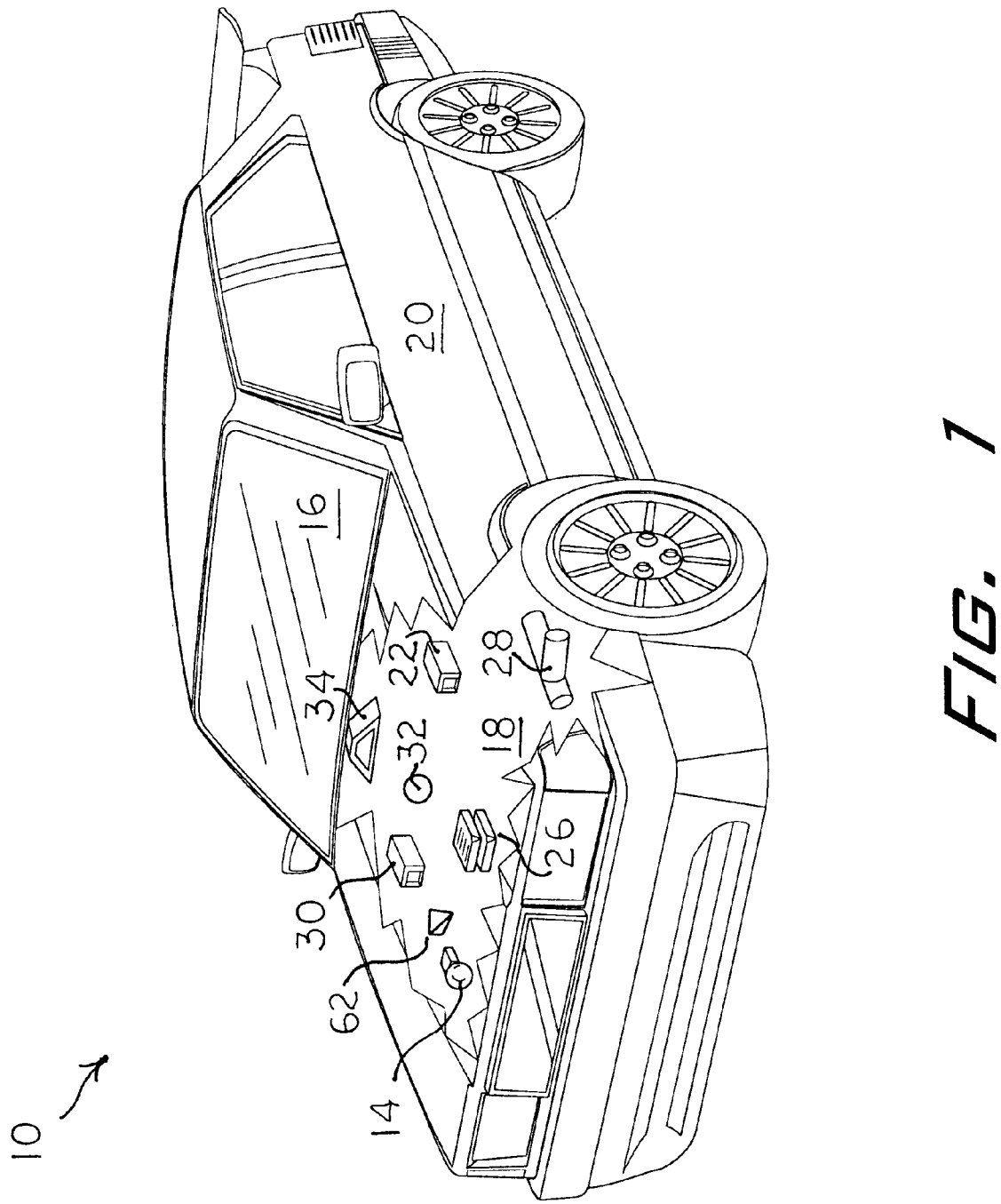
FIG. 1 is an environmental, perspective view of a speed limit control system on a highway and inside a travelling car according to the present invention.
Figure 2:
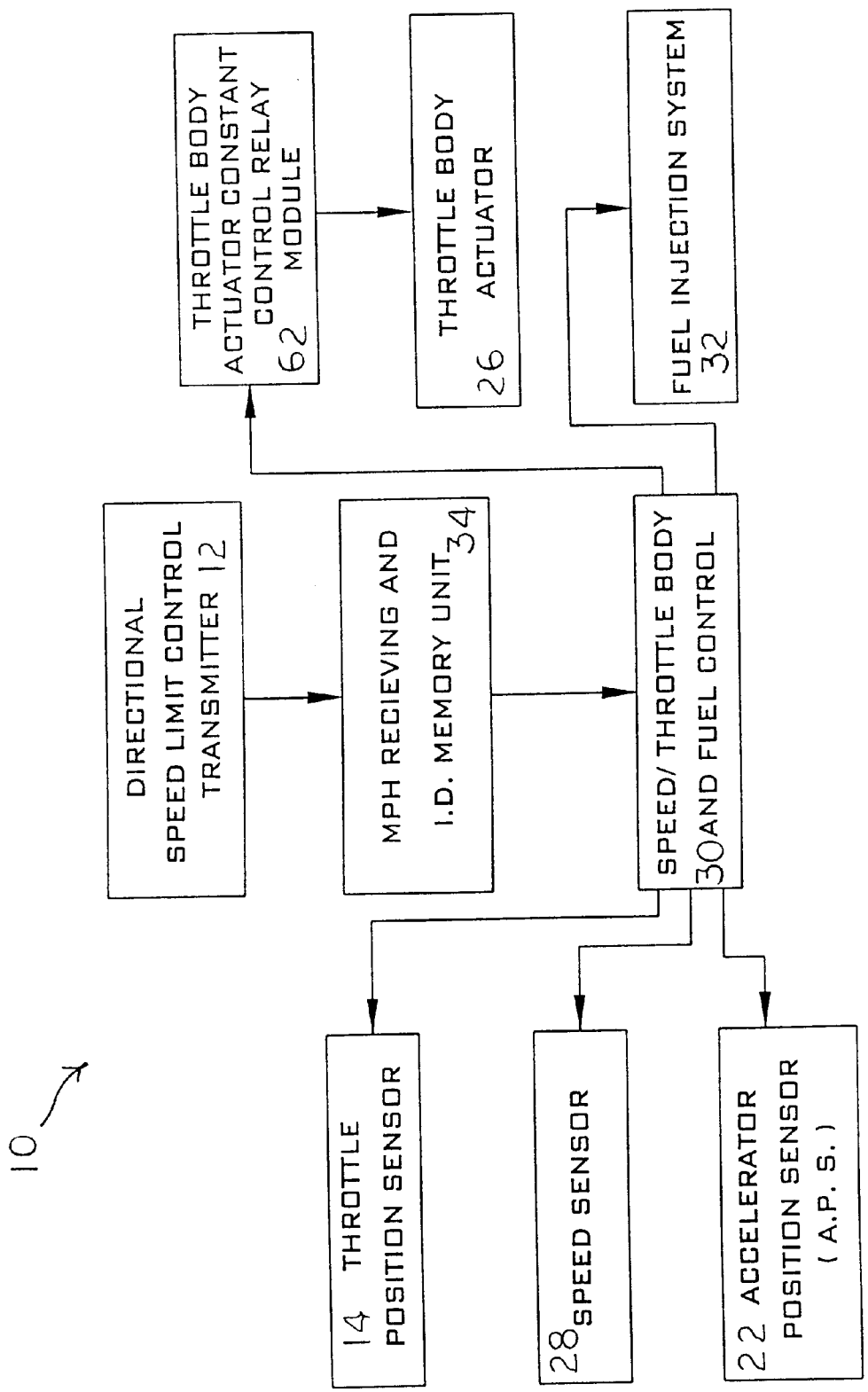
FIG. 2 is a diagram of the speed limit control system and the external speed monitor control unit on a highway.

The present invention is directed to a speed limit control system 10 illustrated in FIGS. 1 and 2 devoid of automatic brake control comprising a fixed speed limit control transmitter device 12 (FIG. 2) adapted to transmit directional radio frequency signals to command receiving modules within a limited range on a road. The fixed speed limit control transmitter device is incorporated in an existing illuminated traffic sign element selected from the group consisting of a traffic lights, highway signs, rural signs, shopping mall signs, and residential street signs.

A throttle body actuator constant control relay module 62 (FIG. 2) receives command signals from the computer 30. Relay module 62 located in the engine compartment 18 (FIG. 1) delivers data to and operates the throttle body actuator 26.

A throttle position sensor device 14 is located next to a throttle body intake (not shown) in the engine compartment 18 of a vehicle 20. An accelerator position sensor device 22 which receives the data from the accelerator pedal 52 via the accelerator cable 54 and accelerator linkages 56 are all located under a dashboard 24 of the vehicle 20. A throttle body actuator device 26 is located next to the throttle body (not shown) in the engine compartment 18. A vehicle speed sensor device 28 is located on the hub assembly (not shown) in the engine compartment 18 of the front-wheel drive vehicle 20. It is noted that the vehicle speed sensor device 26 would be located by the rear wheel axle and shaft for a rear-wheel drive vehicle 20. A vehicle speed restraint, throttle body and fuel injection microcomputer control unit 30 (or Speed Limit Control (S.L.C.) computer having an override element is located under the dashboard 24. The microcomputer 30 functions to (1) control and restrain the vehicle speed with the fuel injection system 32 having an override element, (2) control the throttle body actuator 26 by the throttle body actuator constant control relay module 62, and (3) the fuel injection system 32.

Figure 4:
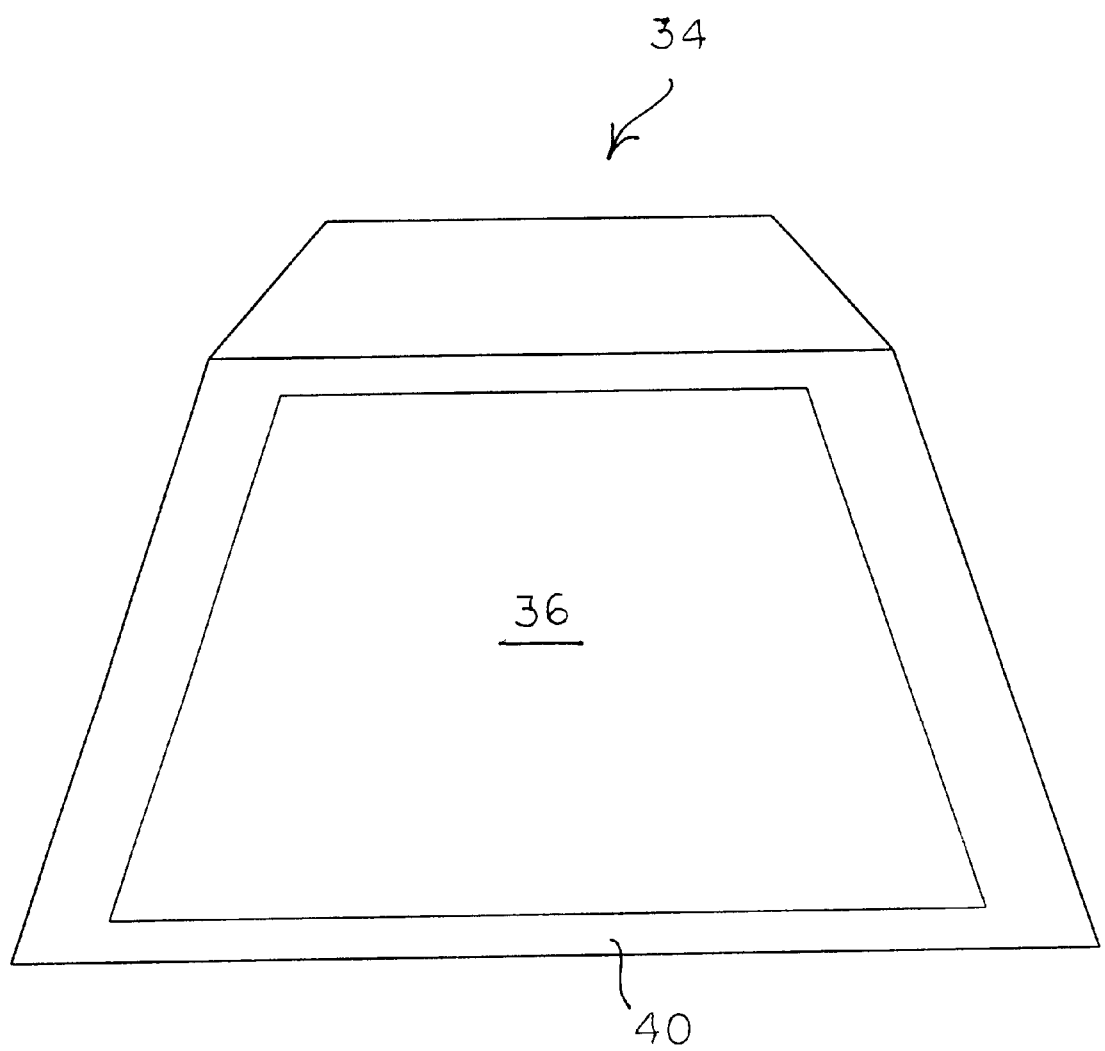
FIG. 4 is a front perspective view of the speed limit control module unit with the built-in illuminated green functional light.

FIG. 4 depicts the front face of the MPH receiving and identifying memory unit or module 34 having an adequate illumination means such as colored diodes 36 (green preferred) which indicates that the MPH receiving and identifying unit or module 34 is ready to receive the speed limit control signal from the fixed speed limit control transmitter device 12. More specifically, the illumination means of the colored diodes or a digital sign 36 indicates that the entire speed limit control system 10 of the vehicle 20 is functioning properly to the driver, and informing the law enforcement officials that the vehicle's control system 10 is performing properly. The base 40 of the module 34 is mounted on the dashboard 24. It should be noted that module 34 is positioned against the windshield 16 to minimize any visual distraction of the green light illumination to the driver.

The vehicle 20 is automatically controlled to lower and restrain its speed, due to the appropriate decrease throttle body in fuel injection to the engine, to the posted speed limit by the fixed speed limit control transmitter device 12 as illustrated in the schematic block diagram of FIG. 2. The transmitter device 12 communicates automatically with oncoming vehicular traffic by transmitting the speed limit signals to, and received by, the approaching vehicle's memory module 34. It is imperative that every vehicle would have the present invention installed whether in the production line or retrofitted as required by either a State or Federal law.

Figure 3:
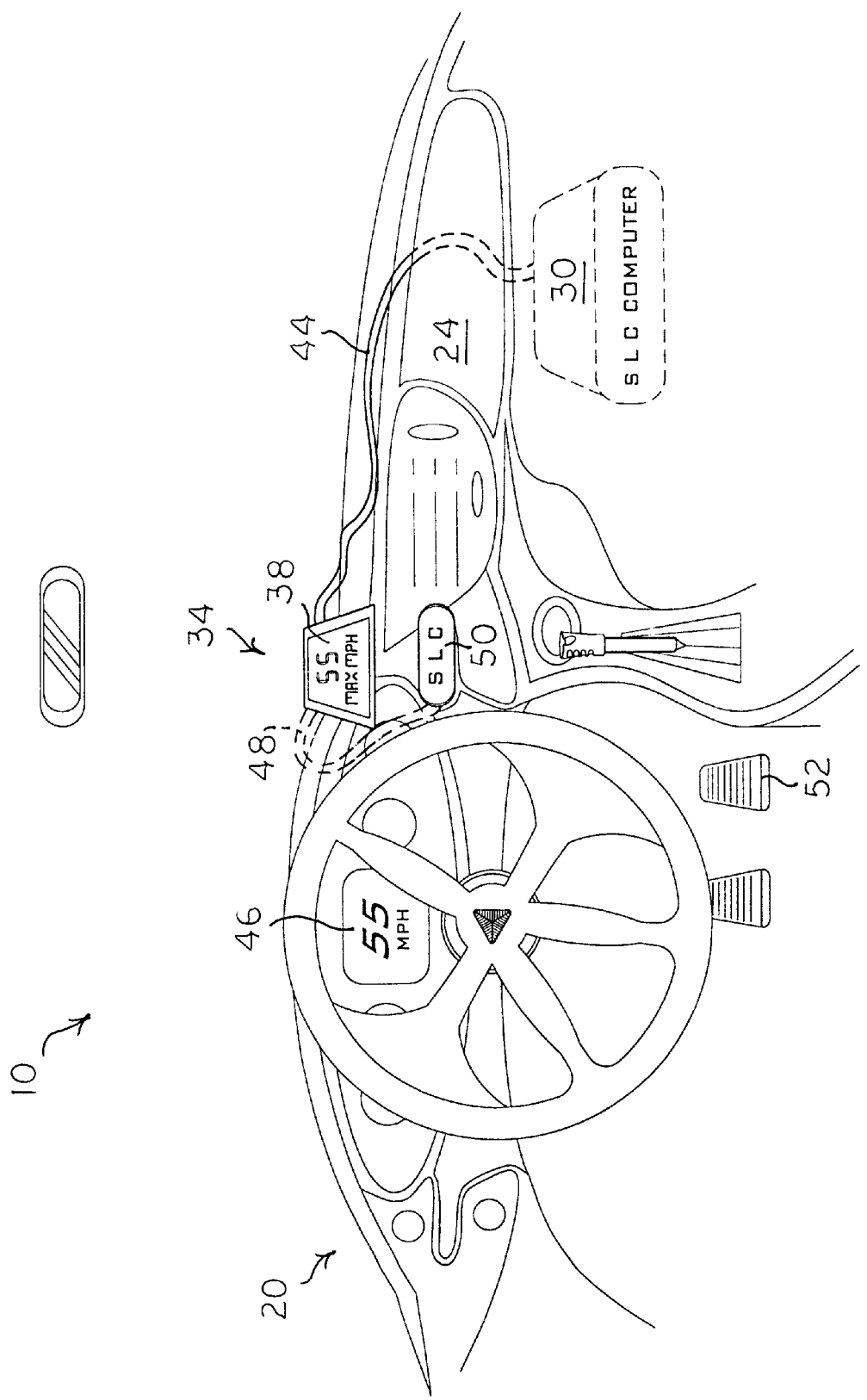
FIG. 3 is an environmental schematic elevational view of a speed limit control module unit on a dashboard of a car with other designated system units.
Figure 5:
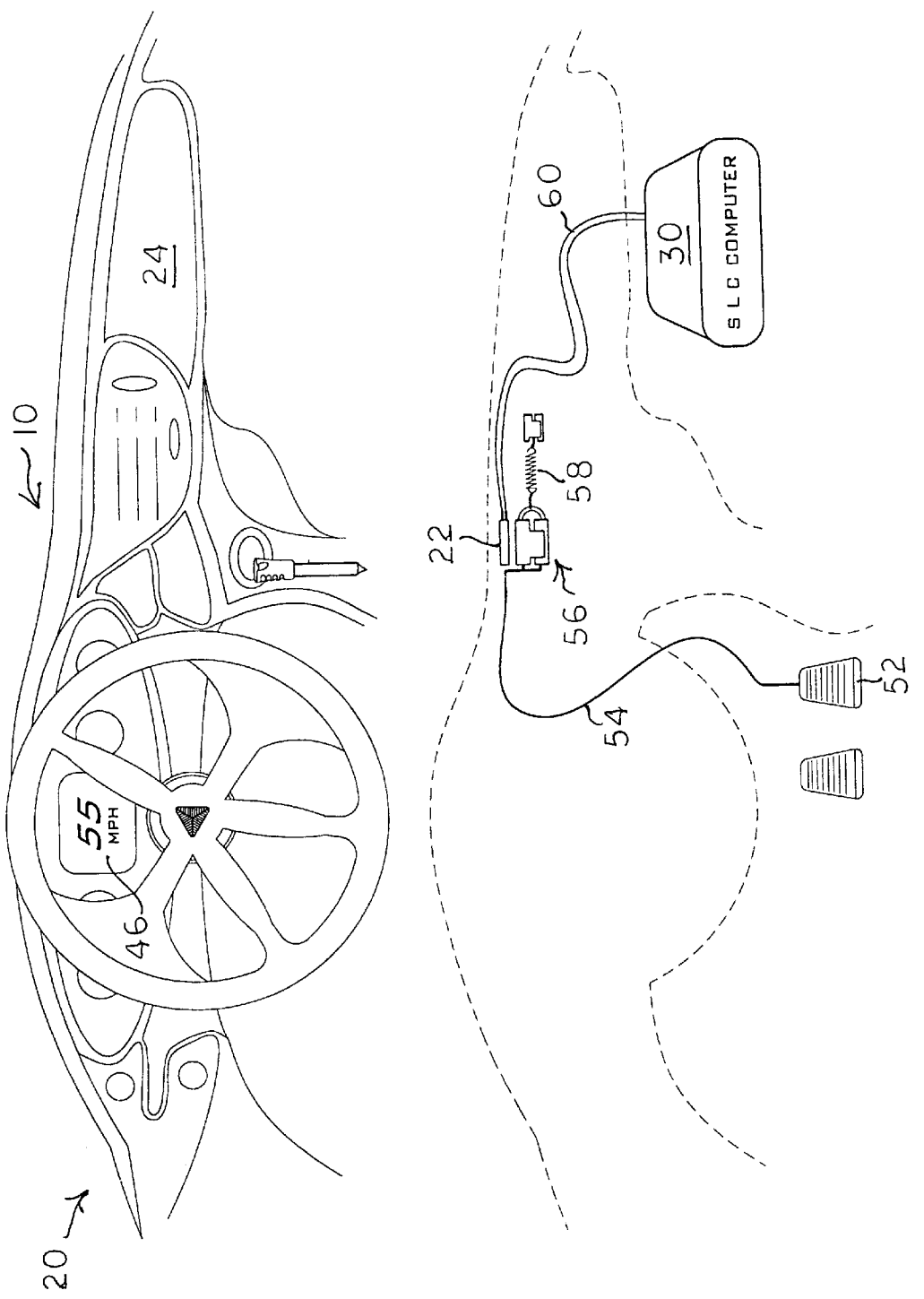
FIG. 5 is a front elevational view of the dashboard, partially broken away, to show the accelerator hook up and control.

FIGS. 3 and 5 illustrate the elements of the speed limit control system 10 positioned inside the vehicle 20. In FIG. 3, the speed limit transmission signals have been received by the MPH receiving and identifying memory unit or module 34 and communicated by electrical wire 44 to the vehicle speed restraint, throttle body and fuel injection microcomputer control unit or S.L.C. computer 30 which issues commands. The speedometer 46 now indicates compliance of the vehicle 20 to the imposed speed limit. An electrical wire 48 from the module 34 signals the colored warning light 50 (preferably red) on the dashboard 24 to illuminate when the speed limit control system 10 is disabled.

In FIG. 5, the S.L.C. microcomputer 30 receives the status signals communicated from the accelerator position sensor or A.P.S. device 22 via the electrical wire 60 regarding the position of the accelerator pedal 52 via an accelerator cable 54 connected to accelerator linkages 56. An accelerator return compression spring 58 is provided for return movement of the accelerator cable 54 when pressure on the accelerator pedal 52 is relaxed. It is noted that although the accelerator pedal 52 is normally used to accelerate the vehicle 20, once the posted maximum speed limit is reached by the vehicle, the microcomputer 30 will restrain and not allow the vehicle to exceed the imposed maximum speed limit no matter how much the accelerator pedal 52 is depressed by the driver. The electrical wiring 60 completes the circuit to the microcomputer 30. It should be noted that this part of the electrical circuit and mechanical linkage is fully protected from the elements by being positioned entirely in the passenger compartment under the dashboard 24.

Figure 6:
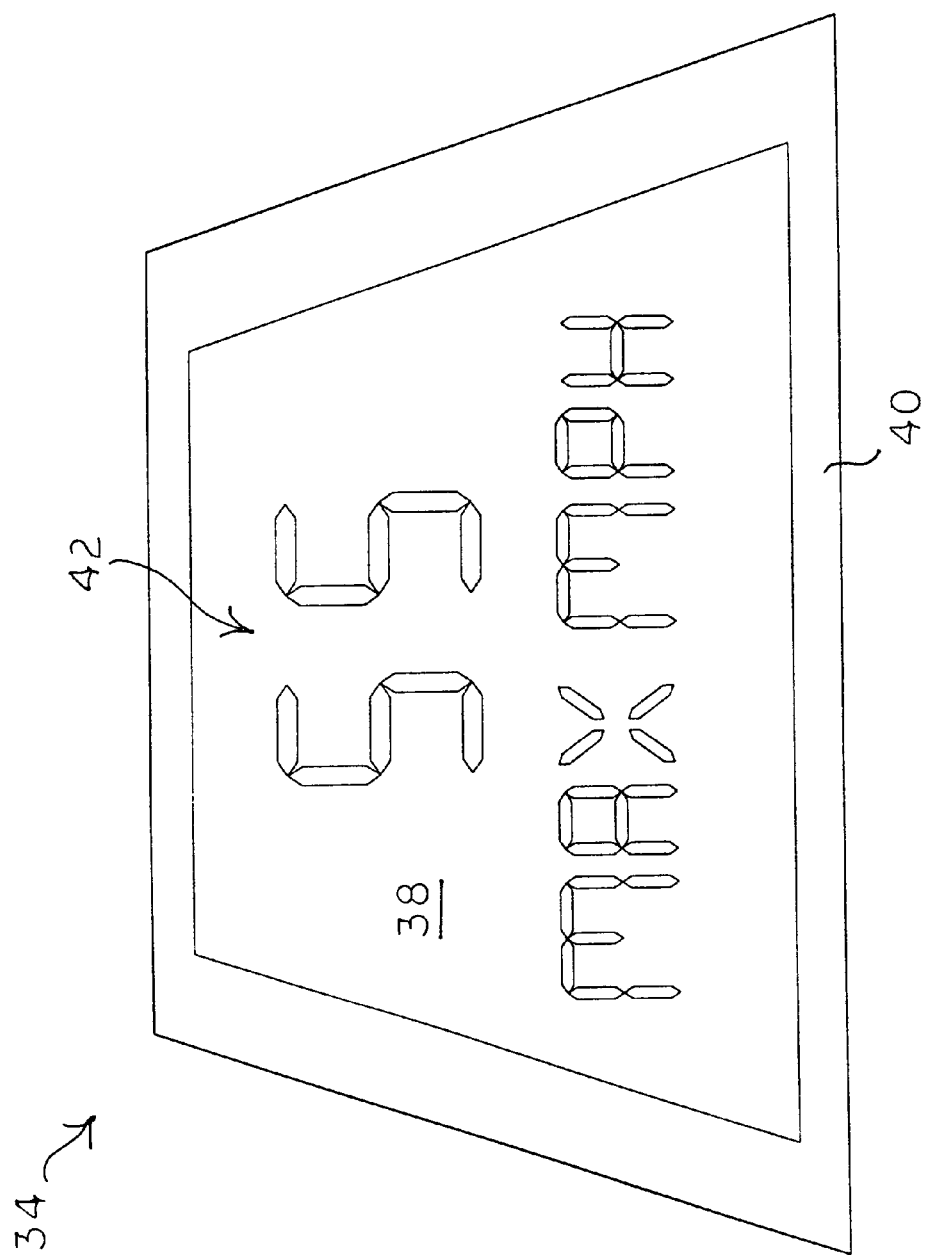
FIG. 6 is a rear elevational view of the speed limit control module unit exhibiting the maximum posted speed limit in miles per hour (MPH) being monitored.

FIG. 6 illustrates the rear face 38 of the module 34 having a green digital sign 42 showing the required speed limit and the indicia, MAX MPH.

An important advantage of this system resides in the presence of an override control regimen for the driver when the electrical power of the fixed speed limit control transmitter device 12 is out as controlled by the vehicle's microcomputer 30. The driver can still drive the vehicle 20 in a free-lance mode. Secondly, the override control is automatically on and functional until the driver enters a zone where the speed limit control system 10 is operative.

The microcomputer 30 will eliminate its memory once the ignition is shut off and voltage to the microcomputer is terminated. In this manner, the microcomputer 30 will never reach its memory capacity limit, thus ensuring an available computer means.

Thus, an economical and effective system for controlling speeding excesses of travelling vehicles on roads has been shown, which system utilizing the existing electrical sources of traffic lights, highway lights, street lights, rural lights, etc., available, and the installation of the speed limit control system 10 in a vehicle 20 of the present invention.

It is to be understood that the present invention is not limited to the embodiments described above, but encompasses any and all embodiments within the scope of the following claims.

I claim:

1. A speed limit control system devoid of automatic brake control comprising:

a fixed speed limit control transmitter device adapted to transmit directional radio frequency signals to command receiving modules within a limited range on a road, wherein said fixed speed limit control transmitter device is incorporated in an existing illuminated traffic sign element selected from the group consisting of a traffic lights, highway signs, shopping mall signs, and residential street signs;

a throttle position sensor device located next to a throttle body in the engine compartment of a vehicle;

an accelerator position sensor device located under a dashboard of the vehicle;

a throttle body actuator device located next to the throttle body;

a vehicle speed sensor device located on the hub assembly of the vehicle;

a vehicle speed and fuel injection microcomputer control unit located under the dashboard; and a speed limit control receiving and identifying memory module having an illumination means indicating reception of the speed limit control signal from the fixed speed limit control device, and mounted on the dashboard;

whereby the vehicle is automatically controlled to lower its speed to the posted speed limit due to the appropriate decrease in fuel injection to the engine implemented by the fixed speed limit control transmitter device.

2. The speed limit control system according to claim 1, wherein said illuminating means is an enlarged region illuminated by green diodes for enabling notification to law enforcement officials that the speed limit control system of the vehicle is functioning correctly.

3. The speed limit control system according to claim 1, wherein an override system in a free-lance mode is incorporated in the microcomputer control unit for immediate activation when the engine of the vehicle is started and in a functional mode in the event a local jurisdiction lacks electrical power for activating its speed limit control system components.

4. The speed limit control system according to claim 1, wherein turning off the ignition of the vehicle automatically disconnects voltage to the microcomputer control unit and clears its memory.

* * * * *